April 7, 1970    KAZUO SHIBATA ET AL    3,504,978
PLURAL BEAM SPECTROPHOTOMETER WITH A DIFFUSION
PLATE BETWEEN EACH CELL AND DETECTOR
Filed Feb. 3, 1966
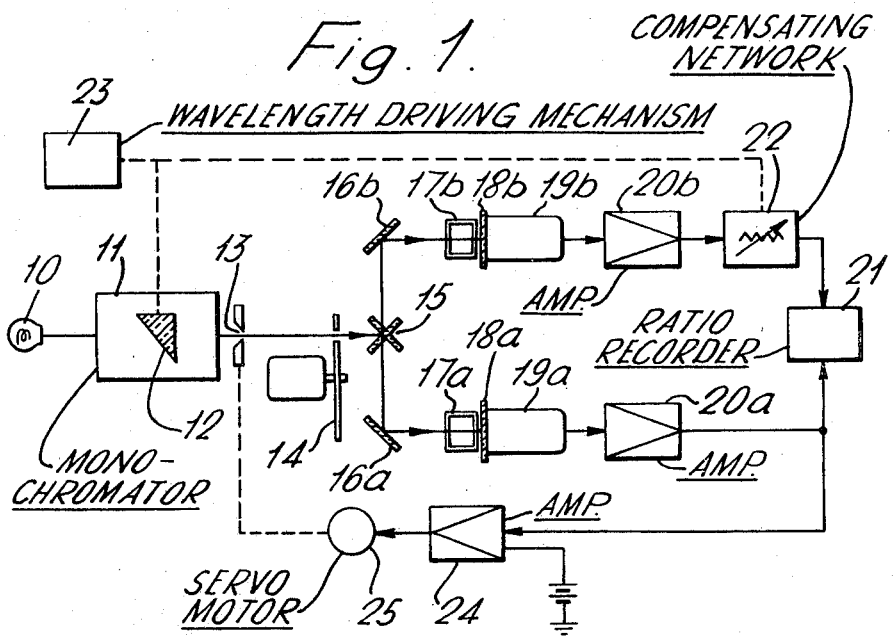
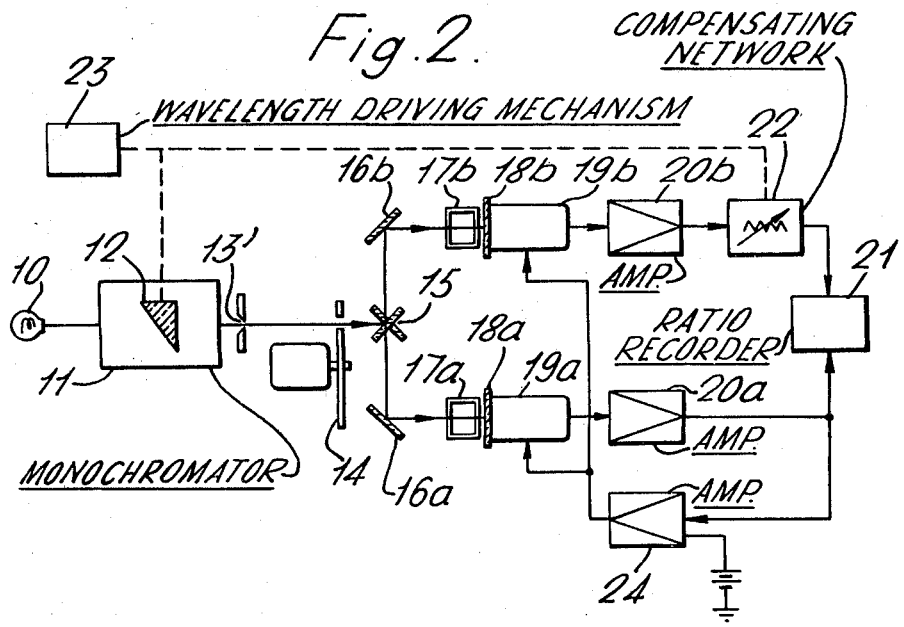

United States Patent Office 3,504,978
Patented Apr. 7, 1970

3,504,978
PLURAL BEAM SPECTROPHOTOMETER WITH A DIFFUSION PLATE BETWEEN EACH CELL AND DETECTOR
Kazuo Shibata, Tokyo, and Yoshio Fukuda, Osaka, Japan, assignors to Shimadzu Seisakusho Ltd., Kyoto, Japan, a corporation of Japan
Filed Feb. 3, 1966, Ser. No. 524,693
Claims priority, application Japan, Feb. 4, 1965, 40/5,863
Int. Cl. G01j 3/42
U.S. Cl. 356—95                                  6 Claims

ABSTRACT OF THE DISCLOSURE

A spectrophotometer having a source of monochromatic light, a prism to disperse the light into different wavelengths, a beam splitter and two reflectors to channel the light beams into two photomultiplier tubes and cells containing a reference material and a sample material, respectively. Mounted between and in planar contact with each cell and tube combination is a diffusion plate. The signals of the tubes pass through amplifiers and into a ratio recorder which is connected with a wavelength driving mechanism for adjusting the prism.

---

This invention relates to a spectrophotometer of the double-beam, double-detector type, in which a monochromatic light at a sequence of wavelengths is split into two beams, which are separately passed through a reference and a sample material and received by two separate detectors.

Double-beam spectrophotometers may be classified into two types: that is, a single-detector type and a double-detector type. As the words imply, in the former the two light beams that have been transmitted through the reference and sample materials, respectively, are alternately detected by a single photoelectric tube, while in the latter those two beams are simultaneously but separately detected by two photoelectric tubes. In the spectrophotometer with which the present invention is concerned, the output signals from the two photoelectric tubes are compared and the ratio therebetween are indicated on a recorder, which will be referred to as the ratio recorder hereinafter.

The single-detector type has the disadvantage that it is difficult to distinctly separate the output signal corresponding to the sample beam from the signal corresponding to the reference beam, especially when the former signal is small in magnitude, with resulting errors in the measurement; while the double-detector type has no such disadvantage and should enable very accurate measurement. Practically, however, despite the disadvantage the single-detector type is in wider use than the double-detector type. This is because of the following circumstances.

In double-beam spectrophotometers, if the same solvent is put in the cells placed in the paths of the two light beams, the indication on the recorder chart showing the base line of absorbance would theoretically be straight along the whole range of wavelengths. Practically, however, especially with the double-detector type it is very difficult to obtain such a straight base line over the whole range of wavelengths. The reasons are as follows:

The quantum efficiency of the photosensitive surface of a photoelectric tube varies with wavelength to such an extent that at a certain wavelength it becomes as much as one hundred times that at a different wavelength. Moreover, no two photoelectric tubes of the same type have the same quantum efficiency of the photosensitive surface, but there is always a considerable difference in the efficiency between individual tubes. Therefore, even if the optical inputs applied to the two photoelectric tubes are of the same amount of energy which varies with wavelength in exactly the same degree, the outputs of the two tubes vary with wavelength differently from each other so that the ratio therebetween cannot be kept constant regardless of the wavelength of the optical inputs. In order to keep the ratio constant and enable the recorder to draw as straight a base line as possible, a compensating network is usually inserted between the output of one or both of the photoelectric tubes and the input of the ratio recorder. The network is such that it is controlled in accordance with change in the wavelength of the light beam to vary the level of the signal through the network in accordance with a predetermined program.

For a reliable operation of the ratio recorder, it is required that the reference signal applied to the recorder slide wire should be at a substantially constant level. As previously mentioned, however, the output of the photoelectric tube on the reference side, that is, the reference signal to the recorder slide wire varies with the wavelength of the reference beam which is applied to the photoelectric tube. Also, even with the same wavelength of the reference beam, the reference signal varies with the optical properties of the reference material used, such as the index of refraction, light-absorbtion and/or light-scattering characteristic. Therefore, in order to maintain the reference signal applied to the ratio recorder at a constant level regardless of change in the wavelength and/or the optical properties of the reference material used, it is necessary to adjust the slit aperture through which the monochromatic light beam comes out, thereby regulating the amount of light energy to be applied to the photosensitive surface of the photoelectric tube. Such adjustment, however, poses another problem.

As previously mentioned, the quantum efficiency of the photosensitive surface of one photoelectric tube varies with the wavelength of the optical input applied thereto, differently from that of another photoelectric tube of the same type. Moreover, the efficiency of one and the same photoelectric tube differs locally at different parts of the photosensitive surface thereof. Then, if the slit aperture is changed in accordance with the wavelength of the light beam and/or the reference material used, there will necessarily result a change in the shape and/or size of that portion of the photosensitive surface of the photoelectric tube which is impinged upon by the light beam. In other words, when the slit aperture is changed, the light beam will necessarily fall in a different shape and/or size on a different position of the photosensitive surface of photoelectric tube. Moreover, when a different reference material is used, it is necessary to change the slit aperture according to a different schedule, while changing the wavelength of the light beam, in order to maintain the reference signal applied to the ratio recorder at a substantially constant level. This causes the shape and size of the light beam as it impinges on the photosensitive surface of the photoelectric tube to become different from those with the reference material previously used. Then, because of the local difference in sensitivity of the photosensitive surface of the photoelectric tube, in order to keep the base line of absorbance straight on the ratio recorder it becomes necessary to revise the program in accordance with which the compensating network has been arranged. This certainly is unpractical.

Accordingly, the primary object of the invention is to provide a double-beam, double-detector type of spectrophotometer in which the two photoelectric tubes are completely free of the local difference in sensitivity of their respective photosensitive surfaces. The elimination of the local difference makes it not only easier to arrange the program in accordance with which the compensating network is constructed, but also unnecessary to rearrange the program even when there is a change in the schedule according to which the slit aperture is changed with the wavelength of the light beam.

Other objects, features and advantages of the invention will become more apparent from the following detailed description of preferred embodiments thereof with reference to the accompanying drawings, wherein like reference numerals denote like parts, and wherein;

FIG. 1 is a schematic drawing of one embodiment of the invention; and

FIG. 2 is a schematic drawing of another embodiment of the invention.

Referring now in detail to the drawings, first to FIG. 1, there is shown a light source 10 which is adapted to produce a light over the required range of wavelengths. The light from the source enters a monochromator 11 including a prism 12, which disperses the light into different wavelengths, among which a selected one is passed through a slit 13 and a chopper 14 to a beam splitter 15, where it is split into two beams. One of the beams is directed by a reflector 16a to a container or cell 17a adapted to contain, say, a reference material, while the other beam is directed by a reflector 16b to a container or cell 17b adapted to contain, say, a sample material. A light diffusing plate 18a has its one surface disposed close to, or in substantial contact with, the light emerging surface of the cell 17a and its opposite surface arranged in substantial contact with the light entering window surface of a head-on type of photomultiplier tube 19a having a large photosensitive area, preferably, just on the inside surface of the window. The light beam transmitted through the cell 17a is diffused by the plate 18a and then is sensed by the photomultiplier tube 19a, whereupon it produces an output, which is amplified by an amplifier 20a and is applied to a ratio recorder 21. The plate 18a may be made of any suitable material such as quartz, having a frosted surface to be brought into contact with the tube 19a.

A similar diffusing plate 18b is interposed between the cell 17b and a photomultiplier tube 19b of the same type as the tube 19a in the same manner as described above. The light beam transmitted through the cell 17b is diffused by the plate 18b and then is sensed by the photomultiplier tube 19b, whereupon it produces an output, which is applied through an amplifier 20b and a compensating network 22 to the ratio recorder 21. The recorder compares the two input signals and indicates the ratio therebetween. The compensating network 22 is such that it is controlled in accordance with change in the wavelength of the light beam to vary the level of the signal through the network in accordance with a predetermined program.

A wavelength driving mechanism 23 is provided for selecting a desired one of the wavelengths provided by the prism 12 and directing it through the slit aperture 13. The mechanism 23 also controls the compensating network 22 in accordance with the wavelength it has selected.

The output of the amplifier 20a is also applied through another amplifier 24 to a servomotor 25, which adjusts the slit aperture 13 in accordance with the wavelength of the monochromatic light which is to pass therethrough.

The most important feature of the invention lies in the interposition of the diffusing plate 18a, 18b between the light emerging surface of the cell 19a, 19b and the light entering window surface of the photomultiplier tube 19a, 19b, with their opposed surfaces being arranged close to, or in substantial contact with, each other. It will be easily seen that even when the light beam is displaced from its previous path or changes in its shape on the surface of the diffusing plates 18a, 18b it has impinged upon, the light emerging from the opposite surface of the diffusing plate is sufficiently diffused to fall evenly and uniformly on the whole photosensitive surface of the photomultiplier tube 19a, 19b. This eliminates the local difference in sensitivity of the photosensitive surface of each of the photomultiplier tubes and leaves only the integral difference in sensitivity, if any, between the two photomultiplier tubes to be attended to, thereby making it unnecessary to rearrange the program, once arranged, according to which the compensating network is constructed.

In the embodiment of FIG. 1, the reference signal applied to the recorder 21 is kept at a substantially constant level by regulating the slit aperture 13 and, consequently, the optical input to the photomultiplier tube 19a. The same effect may be accomplished by the arrangement of FIG. 2 wherein the output of the amplifier 24 is fed back to the photomultiplier tubes 19a, 19b to control their respective output gains.

In the arrangement of FIG. 2, although the slit aperture 13' is kept constant, without any diffusing plates the shapes and sizes of the light beams on the photosensitive surfaces of the respective tubes they impinge upon would vary with the optical properties of the material put in the cells. Therefore, the diffusing plates 18a and 18b are advantageously provided to eliminate the local difference in sensitivity of the photomultiplier tubes 19a and 19b, with the same results as in the embodiment of FIG. 1. Further explanation of FIG. 2 will not be necessary, with the corresponding components being designated by the same reference symbols in FIGS. 1 and 2.

Some preferred embodiments of the invention having been illustrated and described, it should be recognized that there are many modifications and changes thereof without departing from the true scope and spirit of the invention as defined in the appended claims.

What we claim is:

1. A spectrophotometer comprising: means for providing a monochromatic light at a sequence of wavelengths; means for selecting one of said wavelengths to be directed through a slit; means for splitting said monochromatic light of said selected wavelength into two separate beams; a pair of cells each having a substantially planar light entering surface and a parallel substantially planar light emerging surface, said cells being disposed in the paths of said two light beams, respectively; a pair of light diffusing plates each having one surface disposed in substantial planar contact with said light emerging surface of one of said cells; a pair of head-on type of photomultiplier tubes each having a light entering window surface disposed in substantial planar contact with the opposite surface of one of said light diffusing plates; means for comparing the outputs of said photomultiplier tubes and recording the ratio therebetween, and means inserted between at least one of said photomultiplier tubes and said last-named means, for changing the signal from said one photomultiplier tube in accordance with said selected wavelength, thereby compensating for errors in the record caused by the integral difference in sensitivity between said photomultiplier tubes.

2. The spectrophotometer as defined in claim 1, further including means operable in response to the output of the other of said photomultiplier tubes for regulating said slit aperture.

3. The spectrophotometer as defined in claim 1, further including means operable in response to the output of the other of said photomultiplier tubes for controlling the output gains of said photomultiplier tubes.

4. A spectrophotometer comprising: a source of light of different wavelengths; a monochromator including a prism for dispersing said light into said different wavelengths and means for selecting one of said wavelengths to be directed through a slit; a beam splitter for splitting said monochromatic light into two separate beams; a pair of cells disposed in the paths of said light beams, respectively, and each having a substantially planar light entering surface and a parallel substantially planar light emerging surface, a pair of light diffusing plates each having one surface disposed in substantial planar contact with said light emerging surface of one of said cells; a pair of head-on type of photomultiplier tubes each having a light entering window with a photosensitive surface on the inside surface thereof, the outside surface of said window being disposed in substantial planar contact with the opposite surface of one of said light diffusing plates; a ratio recorder for comparing the outputs of said photomultiplier tubes and recording the ratio therebetween, and a compensating network inserted between the output side of said photomultiplier on the sample side and the input side of said ratio recorder, for changing the signal from said photomultiplier tube so that errors in the record caused by the integral difference in sensitivity between said photomultiplier tubes may be compensated for.

5. The spectrophotometer as defined in claim 4, further including means operable in response to the output of said photomultiplier tube on the reference side for regulating said slit aperture.

6. The spectrophotometer as defined in claim 4, further including means operable in response to the output of said photomultiplier tube on the reference side for controlling the output gains of said photomultiplier tubes.

References Cited

UNITED STATES PATENTS

| | | |
|---|---|---|
| 2,437,323 | 3/1948 | Heigl et al. |
| 2,577,815 | 12/1951 | Saunderson et al. |
| 3,161,769 | 12/1964 | McPherson. |
| 3,215,849 | 11/1965 | Golden _____ 250—218 |
| 3,334,537 | 8/1967 | Beattie. |
| 3,369,447 | 2/1968 | Gallaway et al. |

OTHER REFERENCES

"Highly Sensitive Recording Microspectrophotometer," Chance et al.; The Review of Scientific Instruments; vol. 30; number 8; August 1959 pp. 735–741.

RONALD L. WIBERT, Primary Examiner

V. P. McGRAW, Assistant Examiner

U.S. Cl. X.R.

250—218